N. ROLLER.
STOVEPIPE ANCHOR.
APPLICATION FILED OCT. 30, 1911.
1,031,378.
Patented July 2, 1912.
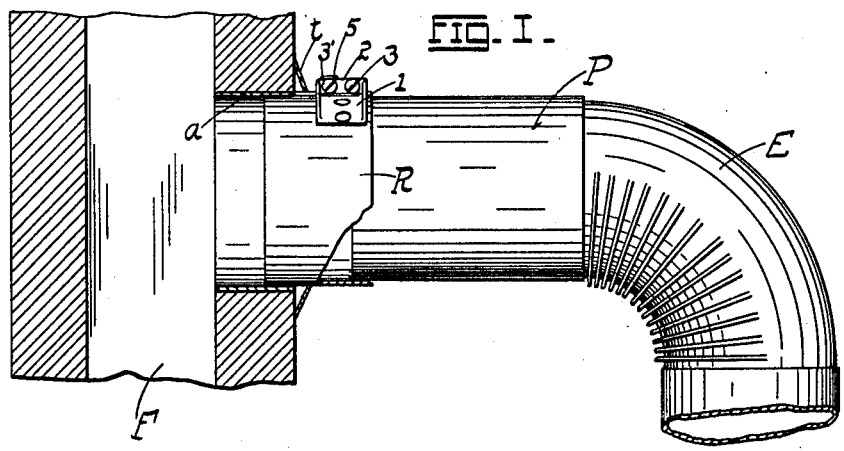
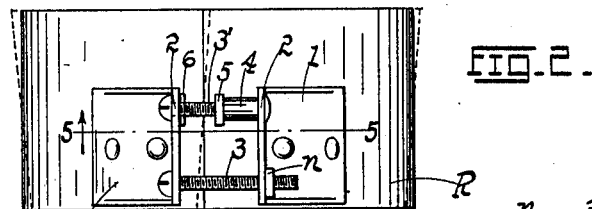
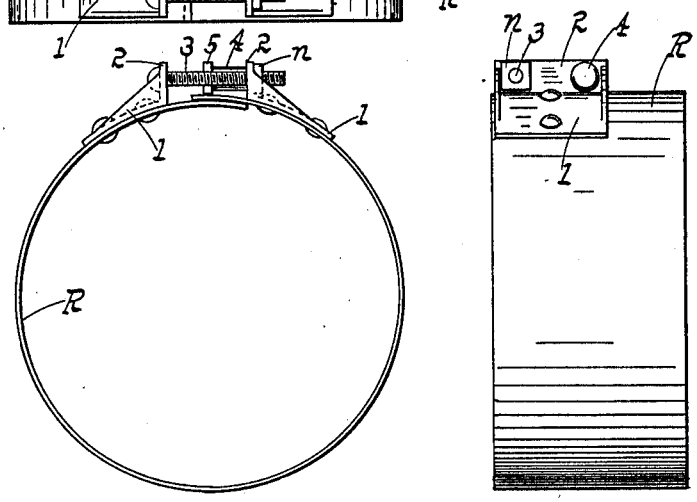
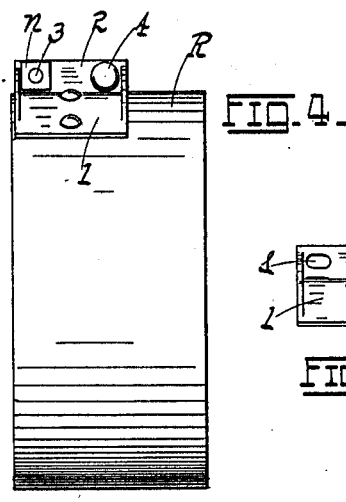
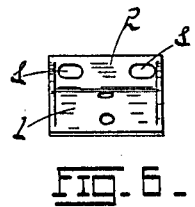
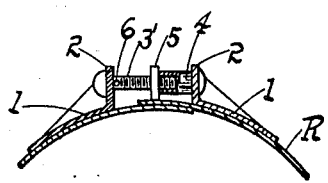
WITNESSES:
Harry A. Beimes
Fannie E. Weber
INVENTOR.
Nannie Roller.
BY
ATTORNEY.

UNITED STATES PATENT OFFICE.

NANNIE ROLLER, OF ST. LOUIS, MISSOURI.

STOVEPIPE-ANCHOR.

1,031,378.　　　　　Specification of Letters Patent.　　Patented July 2, 1912.

Application filed October 30, 1911.  Serial No. 657,646.

*To all whom it may concern:*

Be it known that I, NANNIE ROLLER, citizen of the United States, residing at St. Louis, State of Missouri, have invented certain new and useful Improvements in Stovepipe-Anchors, of which the following is a full, clear, and exact description, reference being had to the accompanying drawings, forming a part hereof.

My invention has relation to improvements in stove-pipe anchors; and it consists in the novel construction of anchor more fully set forth in the specification and pointed out in the claims.

In the drawings, Figure 1 is a side elevation of a stove-pipe and section of flue showing the application of my invention; Fig. 2 is a top plan of the anchor-ring detached; Fig. 3 is an end view of the ring; Fig. 4 is a side view thereof; Fig. 5 is a vertical sectional detail on the line 5—5 of Fig. 2; and Fig. 6 is a detached elevation of one of the brackets secured to the ring.

The object of my invention is to provide a simple anchor for fastening the end of a stove-pipe to the walls of the opening into which the pipe is inserted opposite the smoke-flue.

A further object is to provide an attachment which can be adjusted to different sizes of pipe, all as will more fully appear from a detailed description of the invention which is as follows.

Referring to the drawings, P represents a pipe-section at the discharge end of an elbow E as well understood in the art. At the free end of the pipe P is disposed an open ring R made to envelop the pipe, the ends of the ring overlapping as shown. Disposed on the outside of ring adjacent the ends thereof are brackets 1, 1, having adjacent terminal legs or lugs 2, 2, one of said lugs being provided with transversely elongated slots *s, s*, for the reception of the screws 3, 3', respectively. The outer screw 3 passes through the opposite lug 2, a nut *n* bearing against the face of said lug and serving as a means of maintaining the lugs in proper adjustment once said screw has been turned to bring said adjustment about. The adjacent or inner screw 3' plays loosely in a sleeve 4 projecting from the opposite lug, the free end of the sleeve having a nut 5 bearing against it, said nut being passed over the screw and kept against turning by the engagement of the bottom face of the nut with the ring R. A pin 6 is passed through the screw 3' behind the lug 2 so that the latter may be held against slipping along the screw (3'). The ring R is received by the usual lining ring *a* of the opening of the wall opposite the flue F, and the usual band *t* is passed over the ring R to bear against the flue wall as understood in the art.

The operation of the device is as follows:—The pipe P is inserted into the anchor-ring R and the latter is inserted into the lining *a*. By unscrewing the screw 3' (or that nearest the opening in the flue-wall) the effect will be that the inner overlapping ends of the ring R will be expanded so as to hug the inner face of the member *a*, the adjustment or separation of the edges of the ring R at that point being indicated by the dotted line in Fig. 2. If at the same time the outer screw 3 be screwed or turned so as to bring the corresponding ends of the lugs 2, 2, closer together, it follows that that end of the ring R will close over or grip the pipe P, thus anchoring the latter to the ring. By thus turning one screw 3' so as to unscrew the same, and the other (3) so as to screw the same, the overlapping edges of the ring R will assume the diagonal position shown by the dotted line in Fig. 2, the inner end of the ring R being expanded into firm frictional engagement with the lining *a*, and the outer end being contracted or closed into firm engagement with the pipe P, thus securely anchoring the latter. The nut *n* of course, can not turn as it bears against the ring R, so that a mere turning of the screw 3 in proper direction will effect proper adjustment. The slots *s, s*, allow for the diagonal disposition of the ends of the ring R in the course of the adjustments, the necessary play being accorded the screws 3, 3', under the circumstances.

Having described my invention, what I claim is:—

1. In combination with a stove-pipe, an open ring, lugs carried by the ring adjacent the free edges thereof, screws operating through the lugs across the space between the lugs and spaced apart, one of said screws being adapted to draw one end of the ring into firm gripping engagement with the pipe, and the other screw to separate or spread the opposite end of the ring into firm engagement with the walls of the opening in the wall opposite the flue.

2. In combination with a stove-pipe, an open ring, lugs carried by the ring adjacent the free edges thereof, one of said lugs being provided with a pair of transversely elongated slots spaced apart, a screw passed through one of the slots and through the opposite lug across the space between the lugs, a nut on the screw engaging the lug and ring wall, a sleeve on one of the lugs projecting toward the second slot of the first lug, a screw passed through the second slot and playing freely in the sleeve, a nut on said second screw engaging the sleeve and ring wall, the first screw being adapted to contract one end of the ring over the pipe, and the second screw being adapted to expand the opposite end of the ring against the wall of the opening formed in the wall opposite the flue, substantially as set forth.

In testimony whereof I affix my signature, in presence of two witnesses.

NANNIE ROLLER.

Witnesses:
W. C. KILLEEN,
CHAS. A. BECKER.

Copies of this patent may be obtained for five cents each, by addressing the "Commissioner of Patents, Washington, D. C."